United States Patent [19]
Sato

[11] Patent Number: 5,112,280
[45] Date of Patent: May 12, 1992

[54] SYSTEM FOR CONTROLLING A CONTINUOUSLY VARIABLE TRANSMISSION

[75] Inventor: Keiji Sato, Tokyo, Japan

[73] Assignee: Fuji Jukogyo Kabushiki Kaisha, Tokyo, Japan

[21] Appl. No.: 656,001

[22] Filed: Feb. 14, 1991

[30] Foreign Application Priority Data

Dec. 14, 1990 [JP] Japan ................ 2-33308

[51] Int. Cl.⁵ .................................. F16H 59/00
[52] U.S. Cl. ........................................ 474/18
[58] Field of Search ................... 474/18, 69, 70; 74/865-867

[56] References Cited

U.S. PATENT DOCUMENTS

| | | | |
|---|---|---|---|
| 4,658,360 | 4/1987 | Osanai et al. | 474/18 X |
| 4,674,363 | 6/1987 | Miyawaki | 474/18 X |
| 4,734,082 | 3/1988 | Tezuka | 474/18 X |
| 4,850,935 | 7/1989 | Morimoto | 474/18 |

FOREIGN PATENT DOCUMENTS

63-28740 2/1988 Japan.
1-206154 8/1989 Japan.

*Primary Examiner*—Thuy M. Bui
*Attorney, Agent, or Firm*—Martin A. Farber

[57] ABSTRACT

A power transmitting system has a belt drive continuously variable transmission for transmitting power of an engine to wheels of a motor vehicle through a torque converter with a lockup clutch. The transmission comprises a primary pulley connected to an output member of the torque converter, a secondary pulley operatively connected to the wheels, a primary cylinder and a secondary cylinder for changing effective diameters of both pulleys, a secondary pressure control valve for controlling secondary pressure applied to the secondary cylinder. Vehicle driving conditions for engaging and disengaging the lockup clutch are detected for producing an engagement or a disengagement signal. In response to the engagement signal, the locked up clutch is locked and the secondary pressure is reduced after a predetermined delay time. In response to the disengagement signal, the secondary pressure is increased and the lockup clutch is disengaged after a predetermined delay time.

4 Claims, 6 Drawing Sheets

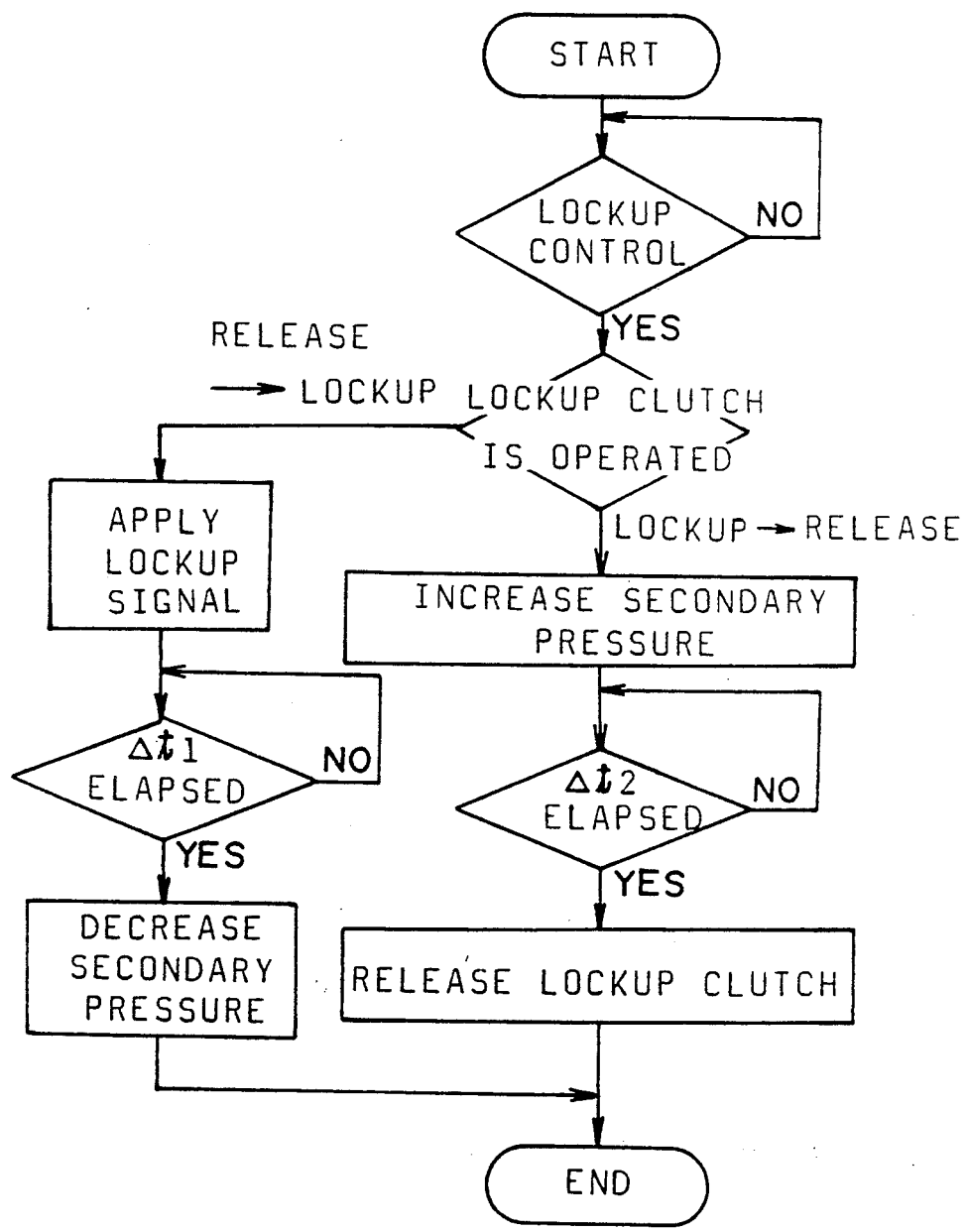

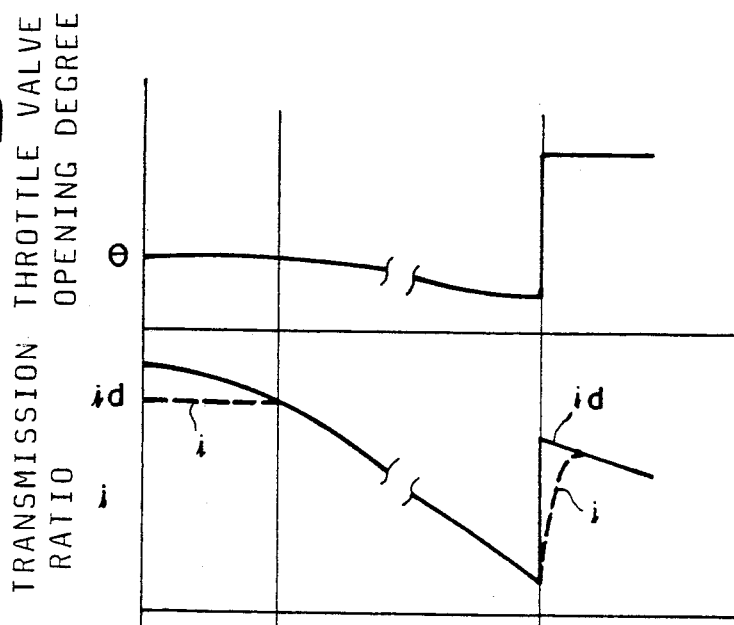
FIG. 4a
FIG. 4b
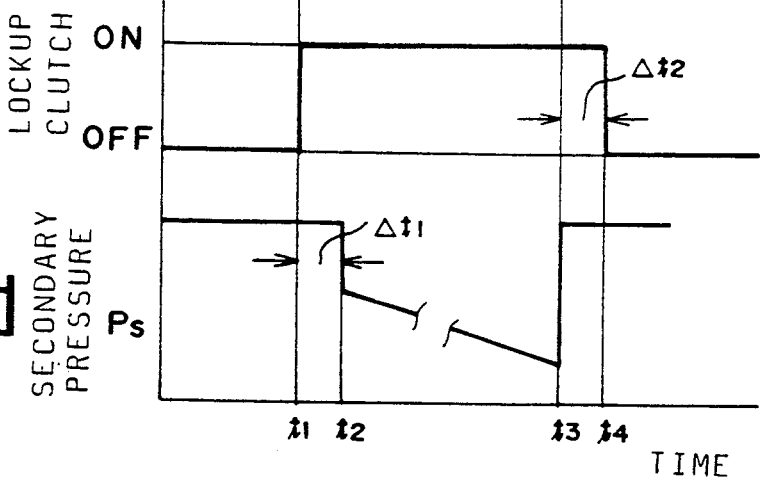
FIG. 4c
FIG. 4d

SYSTEM FOR CONTROLLING A CONTINUOUSLY VARIABLE TRANSMISSION

BACKGROUND OF THE INVENTION

The present invention relates to a hydraulic control system for a continuously variable belt-drive automatic transmission for a motor vehicle having a torque converter with a lockup clutch, and more particularly to a control system for controlling lockup timing of the clutch.

A known control system for the continuously variable belt-drive transmission comprises an endless belt running over a primary pulley and a secondary pulley. Each pulley comprises a movable conical disc which is axially moved by a fluid operated servo device so as to vary a running diameter of the belt on the pulleys in dependency on driving conditions. The system is provided with a hydraulic circuit including a pump for supplying oil to the servo devices, a secondary pressure control valve and a primary pressure control valve. Each valve comprises a spool to control the oil supplied to the servo devices.

The system has an electronic control system for controlling valves of the hydraulic circuit. Transmitting torque is accurately calculated for properly controlling secondary pressure regulated by the secondary pressure control valve to a necessary minimum value. The primary pressure is controlled by the primary pressure control valve to improve response of the transmission in accordance with the engine operating conditions. The electronic control system further controls various systems such as a failsafe system, an antilock brake system (ABS) and a lockup clutch of a torque converter.

In a continuously variable transmission(CVT) provided with the torque converter having the lockup clutch, when the lockup clutch is disengaged, engine output torque is multiplied by the operation of the torque converter. When the lockup clutch is engaged, the engine torque is directly transmitted to the automatic transmission. Therefore, it is preferable to control the secondary pressure in the transmission in accordance with the state of the lockup clutch.

Japanese Patent Application Laid-Open 1-206154 discloses a control system wherein a desired secondary pressure is calculated in accordance with a torque multiplication rate based on a speed ratio between speeds of an input member and an output member of the lockup clutch.

However, when the lockup clutch is operated simultaneously with timing of the increase or the decrease of the secondary pressure, various problems occur due to the response delay in a hydraulic circuit. One of the problems is as follow: at acceleration of the vehicle, increasing the secondary pressure is delayed even though the lockup clutch is already disengaged and the torque converter is operated. To the contrary, there may occur that the secondary pressure decreases before the clutch is completely engaged. Consequently, gripping force of the pulleys exerted on the belt decreases so that the belt slips, thereby decreasing durability of the belt and causing an abnormal shock. Therefore, it is desirable to adjust the timing for operating the lockup clutch and for controlling the secondary pressure so as to reliably increase the secondary pressure in a torque converter operational zone.

Japanese Patent Application Laid-Open 63-28740 discloses a system for controlling the timing of the continuously variable transmission(CVT). In the system, the transmission has a starting clutch and a direct connecting clutch bypassing the transmission. When engine speed exceeds a first reference speed, the direct connecting clutch is engaged to transmit the output power of the engine to driving wheels of the vehicle without passing through the transmission. When the engine speed decreases below a second reference speed which is lower than the first reference speed, the direct connecting clutch is disengaged, whereby the hunting of the system is prevented.

However, such a system having two clutches can not be applied to the CVT with the torque converter.

SUMMARY OF THE INVENTION

The object of the present invention is to provide a control system of a continuously variable transmission having a torque converter where timing for operating lockup clutch and timing for controlling secondary pressure are appropriately controlled.

According to the present invention, there is provided a system for controlling pressure in a belt drive continuously variable transmission for transmitting power of an engine to wheels of a motor vehicle through a torque converter with a lockup clutch, the system having a solenoid operated valve for engaging the lockup clutch, a primary pulley connected to an output member of the torque converter, a secondary pulley operatively connected to said wheels, an endless belt running over the primary and secondary pulleys, a primary cylinder and a secondary cylinder for changing effective diameters of both pulleys, a secondary pressure control valve for controlling secondary pressure applied to the secondary cylinder, a primary pressure control valve for producing a primary pressure applied to the primary cylinder, and actuating means for actuating the secondary pressure control valve in accordance with conditions of the vehicle for controlling the secondary pressure.

The system comprises detector means for detecting vehicle driving conditions for engaging and disengaging the lockup clutch and for producing an engagement signal and a disengagement signal in accordance with the conditions, timing adjusting means responsive to the engagement signal for producing a lockup signal for operating the solenoid operated valve to engage the lockup clutch and for producing a pressure reduction signal for actuating the actuating means to reduce the secondary pressure after a predetermined first delay time, the timing adjusting means further responsive to the disengagement signal for producing a pressure increase signal for actuating the actuating means to increase the secondary pressure, and for producing a lockup release signal for operating the solenoid operated valve to disengage the lockup clutch after a predetermined second delay time.

In an aspect of the invention, the detector means is arranged to produce the engagement signal based on a speed ratio between speeds of an input member and an output member of the torque converter.

The other objects and features of the present invention will become understood from the following description with reference to the accompanying drawings.

BRIEF DESCRIPTION OF THE DRAWINGS

FIG. 3 is a flowchart showing a lockup control operation; and

FIGS. 4a to 4d are timecharts showing characteristics of a throttle valve opening degree, a transmission ratio, lockup clutch and secondary pressures.

DETAILED DESCRIPTION OF THE PREFERRED EMBODIMENTS

Figure 1A:
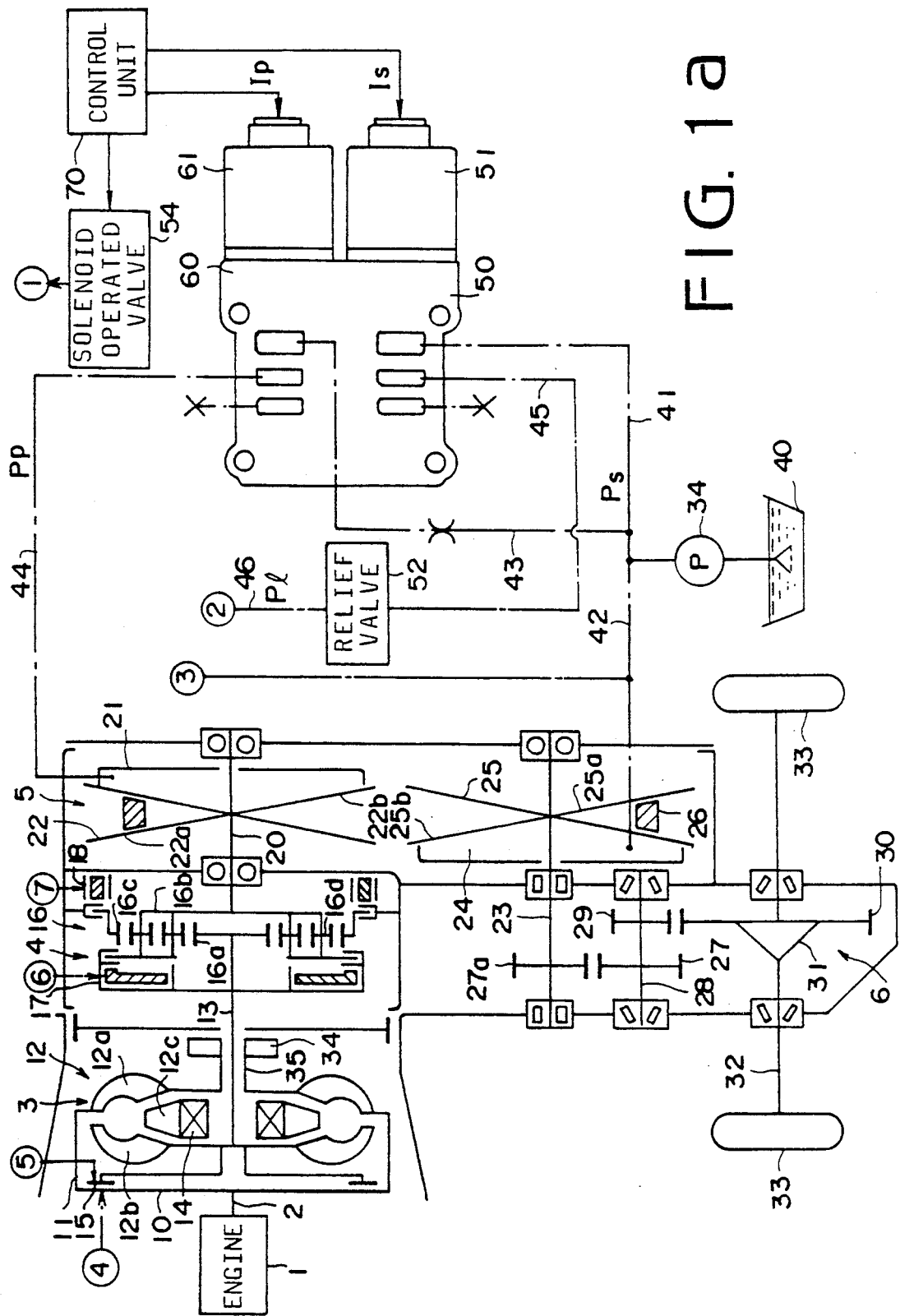
FIGS. 1a and 1b show a schematic diagram of a continuously variable belt-drive transmission to which the present invention is applied.
Figure 1B:
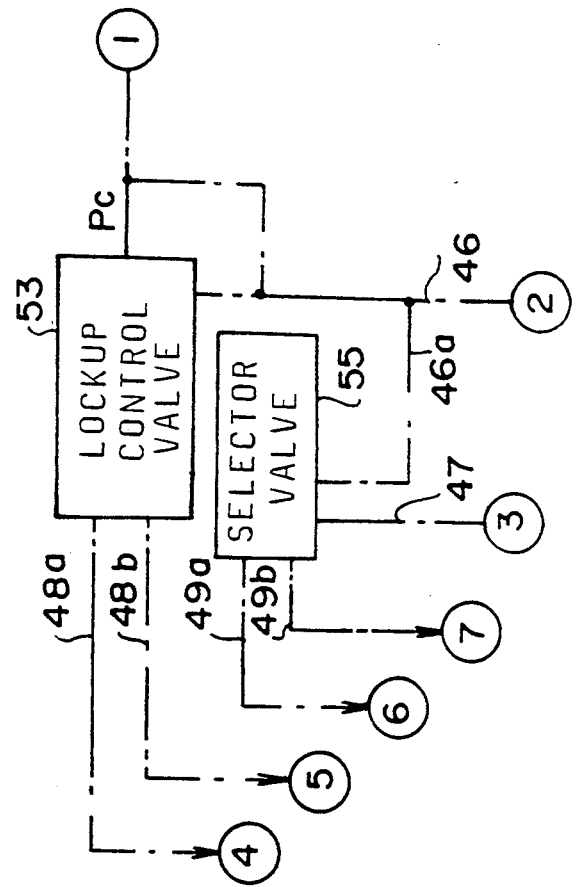

FIG. 1 shows a two-wheel drive power transmission system with an automatic continuously variable belt-drive transmission for a motor vehicle, to which the present invention is applied. An engine 1 is mounted on the motor vehicle at a front portion thereof. The power transmission system comprises a torque converter device 3, a selector device 4, a continuously variable belt-drive transmission 5, and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11 by welding, a turbine 12b connected to an input shaft 13, and a stator 12c connected to a one-way clutch 14. The lockup clutch 15 is disposed between the converter cover 11 and the torque converter 12 for making a contact with the cover 11.

The selector device 4 comprises a planetary gear 16 having a pair of pinions 16d, and a sun gear 16a mounted on the input shaft 13. Pinions 16d are supported on a carrier 16b. The sun gear 16a is engaged with a ring gear 16c through pinions 16d. A forward clutch 17 is disposed between the sun gear 16a and the carrier 16b. A reverse brake 18 is disposed between the ring gear 16c and a main case. At forward driving such as a drive range (D) selection, the forward clutch 17 is engaged to lock the sun gear 16a. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A primary pulley 22 and a secondary pulley 25 are mounted on the main shaft 20 and the output shaft 23, respectively. A fixed conical disk 22a of the primary pulley 22 is integral with the main shaft 20 and an axially movable conical disc 22b is axially slidably mounted on the main shaft 20. The movable conical disc 22b also slides in a primary cylinder 21 formed on the main shaft 20 to provide a servo device.

A fixed conical disc 25a of a secondary pulley 25 is formed on an output shaft 23 opposite to the movable conical disc 22b, and a movable conical disc 25b is slidably mounted on the shaft 23 opposite the disc 22a. The movable conical disc 25b has a cylindrical portion which is slidably engaged in a secondary cylinder 24 of the output shaft 23 to form the servo device. A drive belt 26 engages with the primary pulley 22 and the secondary pulley 25. The cylinder 21 of the drive pulley 22 has a pressure receiving area thereof which is larger than that of the cylinder 24 of the secondary pulley 25. Thus, an effective diameter of the pulleys is varied corresponding to various driving conditions.

A drive gear 27a of the final reduction device 6 is secured to the output shaft 23 and engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

Adjacent the torque converter 12, a main oil pump 34 is provided for supplying high pressurized oil for the transmission. An oil pump drive shaft 35 is connected to the impeller 12a and is operatively connected with the converter cover 11. The oil pump 34 is a pump of a roller vane type having a plurality of inlet and outlet ports as a variable displacement pump. Oil in an oil reservoir 40 is supplied to a secondary pressure control valve 50 through a passage 41 by the pump 34 for producing a predetermined secondary pressure Ps. An oil passage 42 connected to the passage 41 is communicated with the cylinder 24 of the secondary pulley 25, so that the secondary pressure Ps is applied to the cylinder 24. The passage 41 is further communicated with a primary pressure control valve 60 through a passage 43 so that the secondary pressure Ps is applied to the primary pressure control valve 60. The cylinder 21 of the primary pulley 22 is applied with a primary pressure Pp through the primary pressure control valve 60 and a passage 44.

The secondary pressure control valve 50 is the type of a proportional solenoid operated relief valve having a proportional solenoid 51.

The proportional solenoid 51 is operated by solenoid current Is supplied from a control unit 70. The current Is produces electromagnetic force which acts to urge a spool of the secondary valve 50. The secondary pressure Ps is automatically set to a value at which the secondary pressure Ps balances with a sum of the electromagnetic force and a spring force applied to the spool. Namely, the secondary pressure Ps is controlled by the current Is.

The primary pressure control valve 60 is the type of a proportional solenoid operated reducing valve having a proportional solenoid 61.

The solenoid 61 is also operated by a solenoid current Ip from the control unit 70. The current Ip produces electromagnetic force to control the primary pressure Pp in the same manner as the secondary pressure control valve 50. The oil drained from the secondary pressure control valve 50 is constantly applied to the torque converter 12, the selector device 4, and the belt 26 to lubricate them.

A passage 45 from the secondary pressure control valve 50 is communicated with a relief valve 52 for producing a relatively high lubricating pressure Pl of the oil. The relief valve 52 is communicated with the lockup control valve 53 through a passage 46. The lockup control valve 53 is communicated with a release side oil chamber of the lockup clutch 15 through a passage 48a and an applying side oil chamber through a passage 48b. The lubricating pressure is also supplied to a solenoid operated on-off valve 54. The solenoid operated valve 54 produces a control pressure Pc in accordance with a lockup signal or a release signal from the control unit 70 to operate the lockup control valve 53, thereby communicating the passage 46 with the passage 48a or the passage 48b.

When the release signal is generated, the lockup control valve 53 is operated to communicate the passage 46 with the passage 48a for supplying the pressure of the oil to the torque converter 12 through the release side oil chamber. When the lockup signal is generated, the passage 46 is communicated with the passage 48b for pushing the lockup clutch 15 to the converter cover 11, which means locking of the torque converter 11.

The passage 46 is further communicated with a selector valve 55 through a passage 46a. The selector valve 55 is communicated with the forward clutch 17 through a passage 49a and with the reverse brake 18 through a passage 49b. The selector valve 55 is provided for selectively connecting passages in accordance with operations of a selector lever for selecting operational ranges such as a parking range (P), a reverse range (R), a neutral range (N), and a drive range (D). In the D range selection, the selector valve 55 operate to communicate the passage 46a with the passage 49a for supplying the pressurized oil to the forward clutch 17. In the R range selection, the passage 46a is communicated with the passage 49b for supplying the pressurized oil to the reverse brake 18, thereby securely engaging the reverse brake 18 by large torque capacity. In the P,N ranges selections, the oil in the forward clutch 17 and the reverse broke 18 are drained.

Figure 2A:
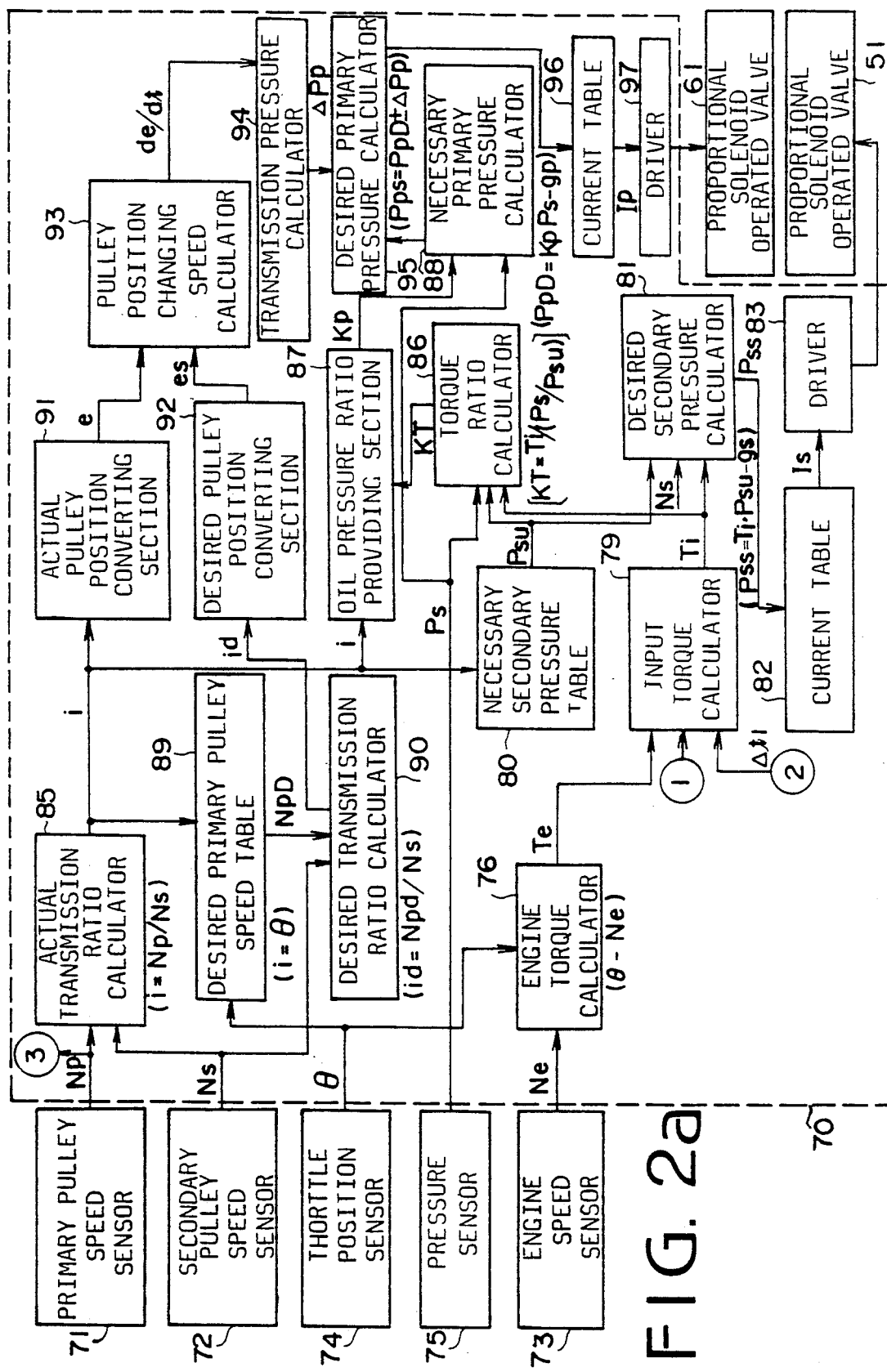
FIGS. 2a and 2b show a block diagram of a control unit of the present invention.
Figure 2B:
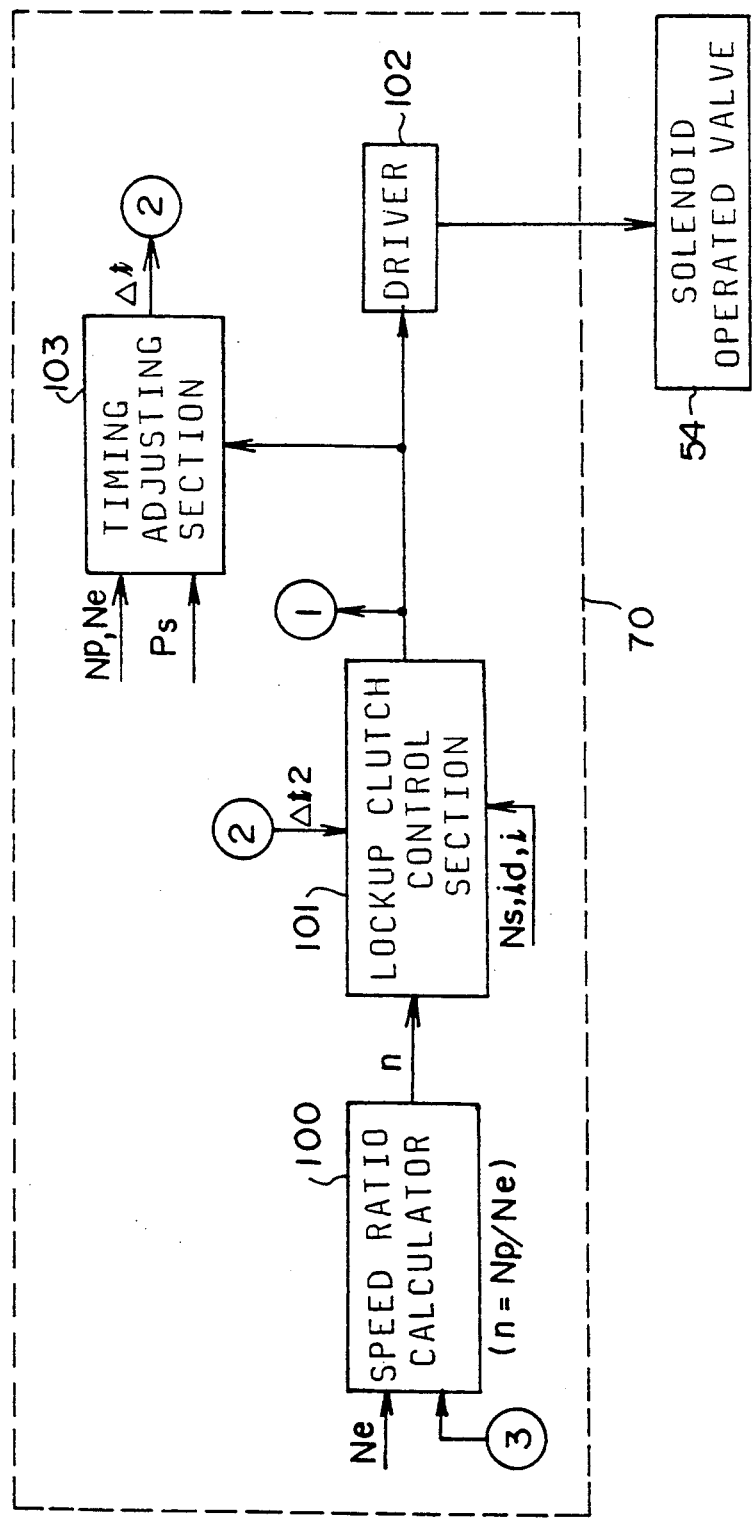

Referring to FIGS. 2a and 2b showing the electronic control system, in the system, a primary pulley speed sensor 71, a secondary pulley speed sensor 72, an engine speed sensor 73, a throttle position sensor 74, and a pressure sensor 75 for detecting the secondary pressure Ps are provided.

Output signals Np and Ns of the sensors 71, 72 are fed to an actual transmission ratio calculator 85 to produce an actual transmission ratio i in accordance with $i = Np/Ns$.

Describing the operation for controlling the secondary pressure, a throttle position signal $\theta$ of the throttle position sensor 74 and an engine speed signal Ne of the engine speed sensor 73 are fed to an engine torque calculator 76, so that engine torque Te is calculated based on throttle position $\theta$ and engine speed Ne. The engine torque Te is applied to an input torque calculator 79 where an input torque Ti to the transmission is calculated. The input torque calculator 79 is further applied with a signal from a lockup clutch control section 101 which determines the lockup or release of the lockup clutch 15 of the torque converter 12. When the clutch 15 is released so that the torque converter 12 is operated, the torque multiplication rate t is estimated so that the input torque Ti is calculated in accordance with $Ti = Te \times t$ in order to increase the secondary pressure Ps. On the other hand, when the lockup clutch 15 is engaged (i.e. $t \approx 1.0$), the input torque Ti is equal to the engine torque Te. Hence the secondary pressure Ps is decreased.

On the other hand, the actual transmission ratio i from the calculator 85 is applied to a necessary secondary pressure table 80 to derive a necessary secondary pressure Psu per unit torque from a look-up table. The necessary secondary pressure Psu is the pressure necessary for preventing the belt from slipping on the pulleys. The necessary secondary pressure Psu and the input torque Ti are applied to a desired secondary pressure calculator 81 to which the primary pulley speed Ns is applied. In the calculator 81, a desired secondary pressure Pss is calculated in consideration of a centrifugal pressure gs in the cylinder 24 as follows.

$Pss = Ti \cdot Psu - gs$

The desired secondary pressure Pss is applied to a solenoid current table 82 to derive a solenoid current Is corresponding to the desired secondary pressure from a look-up table. The solenoid current Is is supplied to a driver 83 which operates the proportional solenoid 51 at the current Is. The secondary pressure Ps is controlled to follow up the desired secondary pressure Pss.

The operation for controlling the primary pressure will be described hereinafter. First, describing the basic concept of the control, in a steady state of the engine, the actual transmission ratio i is determined in accordance with an oil pressure ratio Kp (Pp/Ps) between the secondary pressure Ps and the primary pressure Pp.

On the other hand, when the input torque Ti becomes large, the pulleys are operated to downshift the transmission. It will be seen that as the input torque Ti changes, the actual transmission ratio i changes. Thus, a torque ratio KT between the input torque Ti and a maximum torque (Ps/Psu) transmittable by the present secondary pressure Ps is calculated by a following equation.

$KT = Ti/(Ps/Psu)$

Consequently, as the actual transmission ratio i corresponds to the present transmitting state, the oil pressure ratio Kp is determined. And the oil pressure ratio Kp is represented as a decreasing function of the transmission ratio i and an increasing function of the torque ratio KT. The oil pressure ratio Kp is obtained regardless of the secondary pressure Ps. A necessary primary pressure PPD is calculated in accordance with the oil pressure ratio Kp and the secondary pressure Ps. The primary pressure PPD necessary for keeping the present actual transmission ratio i in dependency on the present input torque Ti in a steady state is obtained in accordance with the secondary pressure Ps.

In a transient state, the primary pressure Pp is controlled in accordance with a flow rate of the oil corresponding to a desired transmission ratio changing speed. The primary pressure Pp is determined in accordance with the transmission ratio changing speed or a pulley position changing speed de/dt. The transmission ratio changing speed is obtained by the deviation between a desired transmission ratio id and the actual transmission ratio i corresponding to the engine operating conditions. In the embodiment, the pulley position changing speed is calculated. Since the pulley position changing speed de/dt is the change of volume of the cylinder 21, that is the flow rate of the oil in the cylinder. So that the valve displacement is calculated. The valve displacement is converted into a pressure $\Delta Pp$ necessary for obtaining the pulley position changing speed de/dt. The pressure $\Delta Pp$ is added to or subtracted from the necessary primary pressure PPD corresponding to upshift or downshift operation of the transmission, so that the desired primary pressure Pps is obtained.

The primary pressure control system has an oil pressure ratio control system and a flow control system.

Describing the oil pressure control system, the control unit 70 is provided with a torque ratio calculator 86 to which the input torque Ti calculated at the calculator 79, the necessary secondary pressure Psu derived from the table 80 and the secondary pressure Ps detected by the pressure sensor 75 are applied for calculating the torque ratio KT. The torque ratio KT is applied to an oil pressure ratio table 87 to which the actual transmission ratio i is applied. The oil pressure ratio Kp is retrieved from the table in accordance with a torque ratio KT and actual transmission ratio i. The oil pressure ratio Kp and the secondary pressure Ps are applied to a necessary primary pressure calculator 88 where the necessary primary pressure PPD is calculated in consideration of the centrifugal pressure gp in the cylinder 21 as follows.

$$PPD = Kp \cdot Ps - gp$$

Describing the flow control system, the actual transmission ratio i and the throttle opening degree θ from the sensor 74 are fed to a desired primary pulley speed table 89 to derive a desired primary pulley speed NPD in accordance with values of the ratio i and the signal 0. The desired primary pulley speed NPD and the output signal Ns are fed to a desired transmission ratio calculator 90 to calculate a desired transmission ratio id in accordance with id = NPD/Ns.

An amount of oil V of the cylinder 21 is proportional to an actual pulley position e and the amount of the oil V is differentiated with time to obtain a flow rate Q which is proportional to the pulley position charging speed de/dt in the ratio 1:1. Thus, it is preferable to calculate the flow rate Q in accordance with the pulley position changing speed de/dt. The actual transmission ratio i and the desired transmission ratio id are converted into the actual pulley position e and a desired pulley position es at an actual pulley position converting section 91 and a desired pulley position converting section 92, respectively. The actual pulley position e and the desired pulley position es are applied to a pulley position changing speed calculator 93 to produce the pulley position changing speed de/dt from the formula as follows.

$$de/dt = K1 \cdot (es - e) \cdot K2 \cdot des/dt$$

where K1, K2 are coefficients, es−e is a controlling amount dependent on the difference between the desired and actual pulley positions, and des/dt is a correction factor for an advancing operation of the system. The pulley position changing speed de/dt is applied to a transmission pressure calculator 94 where the pressure ΔPp is calculated based on the flow in accordance with the changing speed de/dt.

The necessary primary pressure PPD and the transmission pressure ΔPp are applied to a desired primary pressure calculator 95 to calculate the desired primary pressure Pps. At upshifting the transmission, the desired primary pressure Pps is calculated by Pps = PPD + ΔPp. At downshifting the transmission, the desired primary pressure Pps is calculated by Pps = PPd − ΔPp.

The desired primary pressure Pps is applied to a solenoid current table 96 to derive a solenoid current Ip in accordance with the look-up table. The solenoid current Ip is supplied to the proportional solenoid 61 through a driver 97. Thus, the transmission is controlled by feedforward control.

A system for controlling the lockup clutch 15 is described.

The engine speed signal Ne from the engine speed sensor 73 and the primary pulley speed signal Np from the primary pulley speed sensor 71 are applied to a speed ratio calculator 100 to calculate a speed ratio n between the speeds of the input member and the output member of the torque converter 12 in accordance with n = Np/Ne. The speed ratio n, secondary pulley speed Ns from the sensor 72, desired transmission ratio id from the desired transmission ratio calculator 90 are fed to the lockup clutch control section 101. When n≈1, the torque converter 12 is in a zone to be coupled, so that the lockup signal is applied to the solenoid operated valve 54 through a driver 102. When n > 1, the torque converter 12 is in an operational state. Further, when id > i, which means the vehicle is to be accelerated, or Ns < VO (VO is a predetermined reference vehicle speed), it is determined that the torque converter 12 is to be operated. Thus, the lockup clutch control section 101 applies a release signal to the solenoid operated valve 54 to release the lockup clutch 15.

The lockup signal and the release signal are further fed to a timing adjusting section 103 to which the engine speed Ne, the primary pulley speed Np, and the secondary pressure Ps from the pressure sensor 75 are applied. The timing adjusting section 103 adjusts control timing of the secondary pressure Ps at the lock up or the release of the lockup clutch 15 and releasing timing of the clutch 15. More particularly, when the lockup signal is applied, determining that the lockup clutch 15 is actually engaged in accordance with Ne≈Np, the timing adjusting section 103 feeds a timing signal to the input torque calculator 79. Thus the calculator 79 calculates the input torque Ti, assuming that the multiplication rate t is one, in accordance with Ti = Te after a period Δt1. On the other hand, when the timing signal is fed at the release of the clutch 15, the calculator 79 calculates the input torque Ti in dependency on the engine torque Te and the multiplication rate t although the lockup clutch 15 is still engaged. The timing adjusting section 103 further applies a signal to the lockup control section 101 which in turn produces the release signal after a period t2, that is, after the secondary pressure Ps is actually increased.

The operation of the system will be described hereinafter.

When the engine 1 starts, the oil pump 34 is driven by the oil pump driving shaft 35 through the converter cover 11 to supply the pressurized oil to the secondary pressure control valve 50. In this state, where the vehicle is stopping, the desired transmission ratio id and the actual transmission ratio i are set to a maximum transmission ratio (for example larger than 2.5). A desired primary pressure Pps is calculated based on the actual transmission ratio i, the torque ratio KT, the oil pressure ratio Kp and the necessary secondary pressure Psu. A solenoid current Ip corresponding to the desired primary pressure Pps is applied to the primary pressure control valve 60 to drain the oil from the valve 60 so that the primary pressure Pp becomes the lowest pressure. The secondary pressure Ps is applied only to the cylinder 24 of the secondary pulley 25 so that the drive belt 26 engages with the secondary pulley 25 at a maximum running diameter to provide the largest transmission ratio (low speed stage).

While the vehicle is stopping, the lockup clutch control section 101 in the control unit 70 determines the release of the lockup clutch 15. Hence the release signal is applied to the solenoid operated valve 54, thereby rendering the control pressure Pc, for example, zero. The lubricating oil pressure Pl is applied to the release side chamber of the lockup clutch 15 through the lockup control valve 53. The oil is further supplied to the torque converter 12 so as to operate the converter.

When the D range is selected, the selector valve 55 is operated so as to apply the lubricating pressure Pl to the forward clutch 17 to lock the planetary gear 16, so that the input shaft 13 is engaged with the main shaft 20. Thus, the torque converter 12 operates to transmit the power of the engine 1 to the automatic transmission 5. The power of the engine 1 is transmitted to the output shaft 23 at the largest transmission ratio by the drive belt 26 and the pulleys 22, 25 and further transmitted to axles 32 of the driving wheels 33 through the final reduction device 6. Thus, the vehicle is started.

The engine torque Te is calculated at the engine torque calculator 76 and the torque multiplication rate t is estimated accordingly. When the engine torque Te increases dependent on depressing an accelerator pedal at starting the vehicle, the input torque Ti becomes large in accordance with the engine torque Te and the rate t to increase the necessary secondary pressure Psu, so that the desired secondary pressure Pss is increased. Thus, a small solenoid current Is corresponding to the desired secondary pressure Pss is applied to the proportional solenoid 51 of the secondary pressure control valve 50 to increase a control pressure of the secondary pressure control valve 50. The pressure for draining the oil is reduced to increase the secondary pressure Ps.

After the vehicle is started as the engine torque Te is multiplied by the torque converter 12, the control unit 70 determines to start the transmission control. When the desired transmission ratio id becomes smaller than the largest transmission ratio of 2.5 in accordance with the engine operating conditions, the transmission ratio control is started. The desired transmission ratio id is gradually reduced and the pulley position changing speed de/dt is calculated at the calculator 93 so that the transmission pressure $\Delta$Pp is produced to increase the desired primary pressure Pps. The solenoid current Ip is gradually reduced so that the control pressure of the primary pressure control valve 60 is increased in accordance with reduced electromagnetic force of the proportional solenoid 61. Thus, the primary pressure Pp is increased. Diameter of the belt 26 or the primary pulley 22 is increased, thereby upshifting the transmission to a smaller transmission ratio (high speed state).

At the transient state such as acceleration, when the desired transmission ratio id is increased, the transmission pressure $\Delta$Pp is reduced to decrease the desired primary pressure Pps. The solenoid current Ip is increased to reduce the pressure of the control valve 60, so that the primary pressure Pp is controlled to reduce. The belt 26 is shifted to the secondary pulley 25 to downshift the transmission.

In order to converge the actual transmission ratio i to the desired transmission ratio id, the oil pressure ratio Kp is determined in dependency on the actual transmission ratio i and the torque ratio KT which depends on the input torque Ti. The necessary primary pressure PPD corresponding to that in the steady state is calculated in accordance with the oil pressure ratio Kp and the secondary pressure Ps. Thus, the desired primary pressure Pps is calculated based on the necessary primary pressure PPD. Thus, the primary pressure Pp is controlled to maintain the actual transmission ratio i. Consequently, the primary pressure Pp is varied in the entire transmission ratio range between the maximum transmission ratio and the minimum transmission ratio to control the transmission.

As the vehicle is driven while thus controlling the transmission ratio, the operation shown in the flowchart of FIG. 3 is executed. If the speed ratio n of the torque converter 12 becomes substantially 1.0 at a time t1 shown in FIG. 4, when starting or accelerating the vehicle, it is determined to lockup the lockup clutch 15. The lockup clutch control section 101 accordingly applies the lockup signal to the solenoid operated valve 54 so that the control pressure Pc is generated. As a result, the lockup control valve 53 is operated to apply the lubricating pressure Pl to the apply side of the lockup clutch 15, thereby engaging the clutch 15 as shown in FIG. 4c. Thus the torque converter 12 is rendered inoperative. Consequently, the output of the engine is directly transmitted to the automatic transmission 5 through the lockup clutch 15.

At the same time, the timing adjusting section 103 applies a timing signal to the input torque calculator 79 of the secondary pressure control system provided in the control unit 70. Although the lockup clutch 15 is engaged, the calculator 79 temporarily maintains the input torque Ti at a value calculated before engaging the clutch 15. After the period $\Delta$t1 elapses, that is after it is determined that the engagement is completed in accordance with Ne=Np, the calculator 79 starts to calculate the input torque Ti at a time $\Delta$t2, assuming that the torque multiplication rate t is one. Thus the secondary pressure Ps is decreased by a quantity corresponding to the torque multiplication rate t. Hence as shown in FIG. 4d, the secondary pressure Ps decreases in accordance with the low level input torque Ti after the clutch 15 is completely engaged.

Thereafter, the necessary secondary pressure Psu is reduced corresponding to the actual transmission ratio i. When the vehicle speed increases, and when the engine torque Te reduces, the desired secondary pressure Pss is reduced. Thus, the solenoid current Is is increased to reduce the control pressure of the secondary pressure control valve 50 to control the secondary pressure Ps.

The secondary pressure is applied to the cylinder 24 to hold the belt 26 at a necessary minimum force. Thus, the power is transmitted through the transmission without slipping of the belt 26.

When the desired transmission ratio id rapidly increases in order to accelerate the vehicle at a time t3 as shown in FIG. 4b, the lockup clutch control section 101 determines the release of the lockup clutch 15. At that time, the timing adjusting section 103 applies the timing signal to the input torque calculator 79 so as to calculate the input torque Ti with regard to a torque multiplication rate t. The torque multiplication rate t is set at a value larger than one prior to the actual disengagement of the clutch 15. The secondary pressure Ps is thus increased to correspond to the torque multiplication rate t. After elapsing the predetermined period $\Delta$t2 at a time t4, namely, after the increase of the secondary pressure Ps is confirmed by the pressure sensor 75, the timing signal is fed to the solenoid operated valve 54 to release the lockup clutch 15 as shown in FIG. 4c. Since the clutch 15 is disengaged to render the torque converter 12 operative after the secondary pressure is actually increased, the engine torque is sufficiently increased by the torque converter 12 for acceleration. Thus at starting the operation of the torque converter 12, the secondary pressure Ps is already increased to prevent the belt 26 from slipping so that the engine torque increased through the torque converter 12 is exactly transmitted.

The timing adjusting periods $\Delta$t1 and $\Delta$t2 may be determined as functions of factors in the automatic transmission 5, such as engine speed Ne, the primary pulley speed Np, the secondary pulley speed Ns and the speed ratio n. The control system may be modified to calculate the input torque Ti with consideration for inertia force of the torque converter and the lockup clutch 15. When the lockup clutch 15 is locked up, the engine speed Ne decreases, thereby decreasing the inertia force. In the modified system, the calculated input torque is decreased accordingly, so that the secondary pressure Ps can be accurately controlled.

In accordance with the present invention, the lockup clutch of the torque converter is operated at the timing dependent on the control of the secondary pressure. Thus in the torque converter operational zone, the secondary pressure is reliably increased, thereby preventing the belt from slipping on the pulleys and shocks. Hence durability of the belt is improved. On the other hand, the lockup clutch is engaged only after the decrease of the secondary pressure and released after the increase of the pressure so that the response delay in the hydraulic circuit is compensated.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. a system for controlling pressure in a belt drive continuously variable transmission for transmitting power of an engine to wheels of a motor vehicle through a torque converter with a lockup clutch, the system having a solenoid operated valve for engaging the lockup clutch, a primary pulley connected to an output member of the torque converter, a secondary pulley operatively connected to said wheels, an endless belt running over said primary and secondary pulleys, a primary cylinder and a secondary cylinder for changing effective diameters of both pulleys, a secondary pressure control valve for controlling secondary pressure applied to said secondary cylinder, a primary pressure control valve for producing a primary pressure applied to said primary cylinder, and actuating means for actuating the secondary pressure control valve in accordance with driving conditions of the vehicle for controlling the secondary pressure, the system comprising;

detector means for detecting said vehicle driving conditions for engaging and disengaging the lockup clutch and for producing an engagement signal and a disengagement signal in accordance with detected conditions;

timing adjusting means responsive to the engagement signal for producing a lockup signal for operating the solenoid operated valve to engage the lockup clutch and for producing a pressure reduction signal for actuating the actuating means to reduce the secondary pressure after a predetermined first delay time; and said timing adjusting means further responsive to the disengagement signal for producing a pressure increase signal for actuating the actuating means to increase the secondary pressure, and for producing a lockup release signal for operating the solenoid operated valve to disengage the lockup clutch after a predetermined second delay.

2. The system according to claim 1, wherein
   the detector means is arranged to produce the engagement signal based on a speed ratio between speeds of an input member and an output member of the torque converter.

3. The system according to claim 1, wherein
   the timing adjusting means is arranged to produce the lockup release signal in accordance with an actual increase of the secondary pressure after the predetermined second delay time.

4. A method of controlling pressure in a belt drive continuously variable transmission for transmitting power of an engine to wheels of a motor vehicle through a torque converter with a lockup clutch, the system having a solenoid operated valve for engaging the lockup clutch, a primary pulley connected to an output member of the torque converter, a secondary pulley operatively connected to said wheels, an endless belt running over said primary and secondary pulleys, a primary cylinder and a secondary cylinder for changing effective diameters of both pulleys, a secondary pressure control valve for controlling secondary pressure applied to said secondary cylinder, a primary pressure control valve for producing a primary pressure applied to said primary cylinder, and actuating means for actuating the secondary pressure control valve in accordance with driving conditions of the vehicle for controlling the secondary pressure, the method comprising;

detecting said vehicle driving conditions for engaging and disengaging the lockup clutch and producing an engagement signal and a disengagement signal in accordance with detected conditions;

producing a lockup signal for operating the solenoid operated valve in response to the engagement signal to engage the lockup clutch and producing a pressure reduction signal for actuating the actuating means to reduce the secondary pressure after a predetermined first delay time;

producing a pressure increase signal for actuating the actuating means in response to the disengagement signal to increase the secondary pressure; and producing a lockup release signal for operating the solenoid operated valve to disengage the lockup clutch after a predetermined second delay time.

* * * * *